United States Patent
Fabrizi et al.

(10) Patent No.: US 11,399,030 B2
(45) Date of Patent: Jul. 26, 2022

(54) ONTOLOGY BASED CONTROL OF ACCESS TO RESOURCES IN A COMPUTING SYSTEM

(71) Applicant: Kyndryl, Inc., New York, NY (US)

(72) Inventors: Francesco Fabrizi, Rome (IT); Angelo Littera, Rome (IT); Frank G. Marbello, Rome (IT); Claudio Valant, Rome (IT)

(73) Assignee: Kyndryl, Inc., New York, NY (US)

( * ) Notice: Subject to any disclaimer, the term of this patent is extended or adjusted under 35 U.S.C. 154(b) by 375 days.

(21) Appl. No.: 16/042,657

(22) Filed: Jul. 23, 2018

(65) Prior Publication Data
US 2020/0028854 A1    Jan. 23, 2020

(51) Int. Cl.
*H04L 9/40* (2022.01)
*G06F 16/23* (2019.01)
*G06F 16/2458* (2019.01)

(52) U.S. Cl.
CPC ........ *H04L 63/105* (2013.01); *G06F 16/2365* (2019.01); *G06F 16/2471* (2019.01); *H04L 63/20* (2013.01)

(58) Field of Classification Search
CPC ........... G06F 21/604; G06F 2221/2141; G06F 40/30; G06F 40/35; G06F 40/40; G06F 40/42; G06F 40/20; G06F 40/205; G06F 40/295; G06F 16/2452; G06F 16/24522; G06F 16/2471; G06F 16/2365; H04L 63/10–108; H04L 63/20; G06N 5/02; G06N 5/022; G06N 5/025
See application file for complete search history.

(56) References Cited

U.S. PATENT DOCUMENTS

| | | |
|---|---|---|
| 9,384,493 B2 | 7/2016 | Harris et al. |
| 2007/0073585 A1 | 3/2007 | Apple et al. |

(Continued)

OTHER PUBLICATIONS

Vahid R. Karimi et al., "A uniform approach for access control and business models with explicit rule realization," Apr. 2016, International Journal of Information Security, vol. 15, Issue 2 (Year: 2016).*

(Continued)

*Primary Examiner* — Jeremy S Duffield
(74) *Attorney, Agent, or Firm* — Erik Swanson, Esq.; Kevin P. Radigan, Esq.; Heslin Rothenberg Farley & Mesiti P.C.

(57) ABSTRACT

A solution is proposed for controlling access to one or more resources of a computing system. A corresponding method comprises storing a knowledge base, which provides a knowledge of an access control to the resources in conformity with an access control ontology. In response to an update request, the access control ontology is updated according to update assertions obtained from the update request. In response to an access request (for a selected access to a selected resource), the selected access is granted or denied according to a result of an access query (for querying the access control ontology) obtained from the access request. A computer program and a computer program product for performing the method are also proposed. Moreover, a corresponding system (particularly, a control computing machine) is proposed.

8 Claims, 6 Drawing Sheets

(56) References Cited

U.S. PATENT DOCUMENTS

| | | | |
|---|---|---|---|
| 2009/0320093 A1* | 12/2009 | Glazier | G06F 8/10 |
| | | | 726/1 |
| 2010/0042403 A1 | 2/2010 | Chandrasekar et al. | |
| 2011/0093469 A1 | 4/2011 | B'Far et al. | |
| 2011/0321154 A1* | 12/2011 | Dau | G06F 21/6218 |
| | | | 726/17 |
| 2012/0042395 A1* | 2/2012 | Jain | H04L 63/102 |
| | | | 726/30 |
| 2014/0289173 A1* | 9/2014 | Byron | G06N 20/00 |
| | | | 706/12 |
| 2014/0344173 A1 | 11/2014 | Jayade | |
| 2014/0379755 A1* | 12/2014 | Kuriakose | G06F 16/24522 |
| | | | 707/780 |
| 2015/0074045 A1* | 3/2015 | Belfils | G06Q 10/067 |
| | | | 707/609 |
| 2016/0098576 A1* | 4/2016 | Allen | G06F 21/6245 |
| | | | 726/29 |
| 2016/0162456 A1* | 6/2016 | Munro | G06F 40/137 |
| | | | 704/9 |
| 2016/0219048 A1* | 7/2016 | Porras | H04L 41/147 |
| 2016/0232243 A1* | 8/2016 | Clark | H04L 67/1097 |
| 2016/0352778 A1 | 12/2016 | Chari et al. | |
| 2017/0293887 A1* | 10/2017 | Rathbun | G06Q 10/10 |
| 2018/0189413 A1* | 7/2018 | Hosabettu | G06F 16/972 |
| 2019/0050476 A1* | 2/2019 | Florentino | G06F 40/20 |
| 2019/0311003 A1* | 10/2019 | Tonkin | G06F 40/30 |

OTHER PUBLICATIONS

J. Slankas and L. Williams, "Classifying Natural Language Sentences for Policy," 2012 IEEE International Symposium on Policies for Distributed Systems and Networks, 2012, pp. 33-36, doi: 10.1109/POLICY.2012.16. (Year: 2012).*

* cited by examiner

ONTOLOGY BASED CONTROL OF ACCESS TO RESOURCES IN A COMPUTING SYSTEM

BACKGROUND

The present disclosure relates to the information technology field. More specifically, this disclosure relates to the control of access to resources in a computing system.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The control of the access to resources (for example, documents) by corresponding subjects (for example, users) is a key issue in the management of most computing systems. In general terms, this access control is aimed at enabling the (right) subjects to access the (right) resources at right times and for right reasons.

For this purpose, several Identity and Access Management (IAM) applications are available. Briefly, any IAM application allows authenticating each subject, by correlating a digital identity of the subject in the computing system with an actual entity in the real world (for example, a UserID and password of a user). Moreover, the IAM application allows determining an entailment of each subject to perform specific activities on specific resources; for example, a user (owner) may share his/her identity with another user (delegate). The IAM application then allows enforcing the access to the resources by the subjects in compliance with their entitlements (for example, the delegate may read the identity data of the owner when it has been accordingly authorized, but s/he may not update them).

The entitlement of the subjects to perform activities on the resources is determined by access control rules, which are defined in a structured way (i.e., in a formal language that may be interpreted by the IAM application). For example, the IAM application is generally based on a Role Based Access Control (RBAC) model. In this case, one or more roles are defined; each role is assigned a permission to perform specific activities on specific resources (for example, a role of system administrator has the permission of creating, moving and deleting UserIDs and a role of user administrator has the permission of resetting passwords). Each subject is then assigned one or more roles; the roles of the subject determine the activities that the subject is entitled to perform on the resources (in the example at issue, every subject having the role of system administrator may create, move and delete UserIDs and every subject having the role of user administrator may reset passwords).

However, the control access rules (especially when based on the RBAC model) are quite rigid. Conversely, very often the need exists of controlling the access to the resources according to access control policies that may change dynamically. The access control policies are defined in an unstructured way, generally in natural language. Moreover, the access control policies may define relatively complex conditions.

In this case, the access control policies have to be interpreted and translated into suitable access control rules for use by the IAM application. Particularly, for this purpose it may be necessary to define new roles and/or the update of existing ones; moreover, it may be necessary to re-assign the subjects to the (new/updated) roles.

However, this process requires a heavy manual intervention.

Therefore, the process is quite slow and then it may be unsuitable to cope with the dynamicity of the access control policies.

Moreover, the process may require several persons with different expertise to interpret the access control policies correctly, thereby adversely affecting a management cost of the computing system.

In any case, the process may be approximate, prone to errors and difficult to validate.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of controlling the access to the resources according to an ontology.

Particularly, an aspect provides a method for controlling access to one or more resources of a computing system. The method comprises storing a knowledge base, which provides a knowledge of an access control to the resources in conformity with an access control ontology. In response to an update request, the access control ontology is updated according to update assertions obtained from the update request. In response to an access request (for a selected access to a selected resource), the selected access is granted or denied according to a result of an access query (for querying the access control ontology) obtained from the access request.

A further aspect provides a computer program for implementing the method.

A further aspect provides a computer program product for implementing the method.

A further aspect provides a corresponding system.

A further aspect provides a corresponding control computing machine.

More specifically, one or more aspects of the present disclosure are set out in the independent claims and advantageous features thereof are set out in the dependent claims, with the wording of all the claims that is herein incorporated verbatim by reference.

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

DETAILED DESCRIPTION

Figure 1:
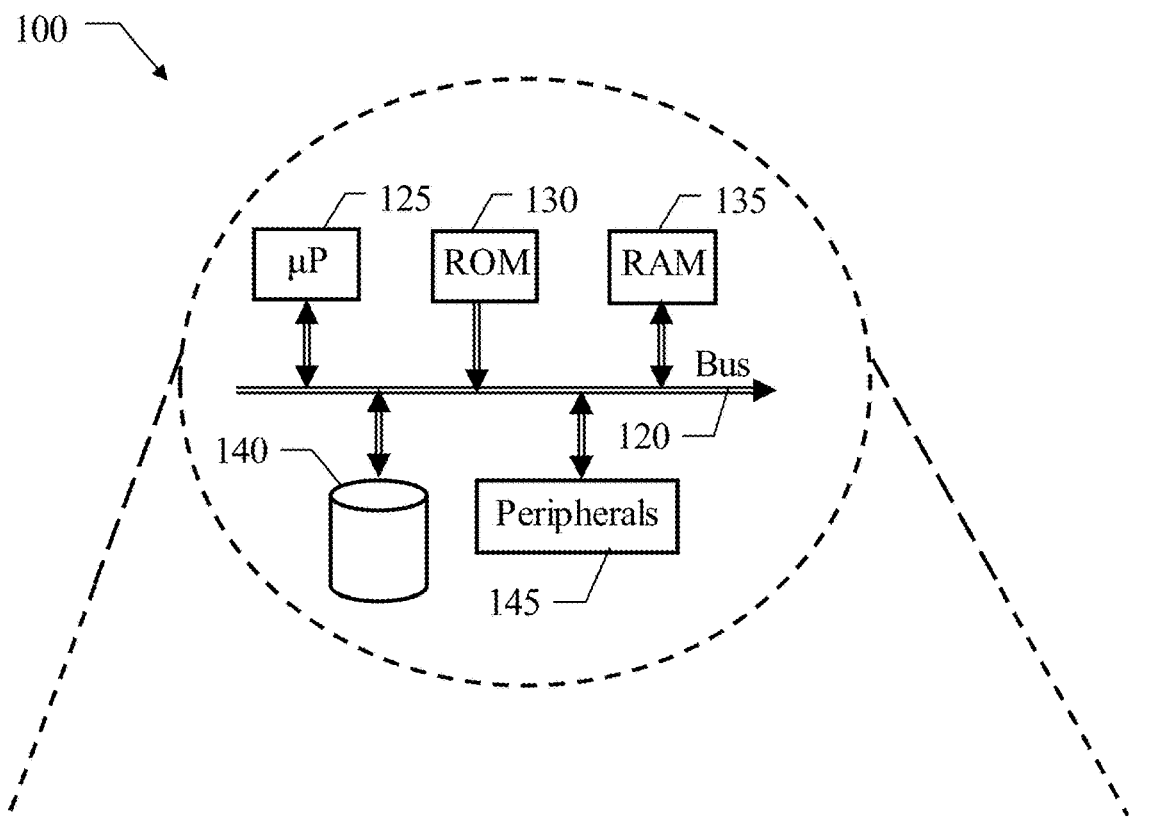
FIG. 1 shows a schematic block diagram of a computing system wherein the solution according to an embodiment of the present disclosure may be practiced.
Figure 1:
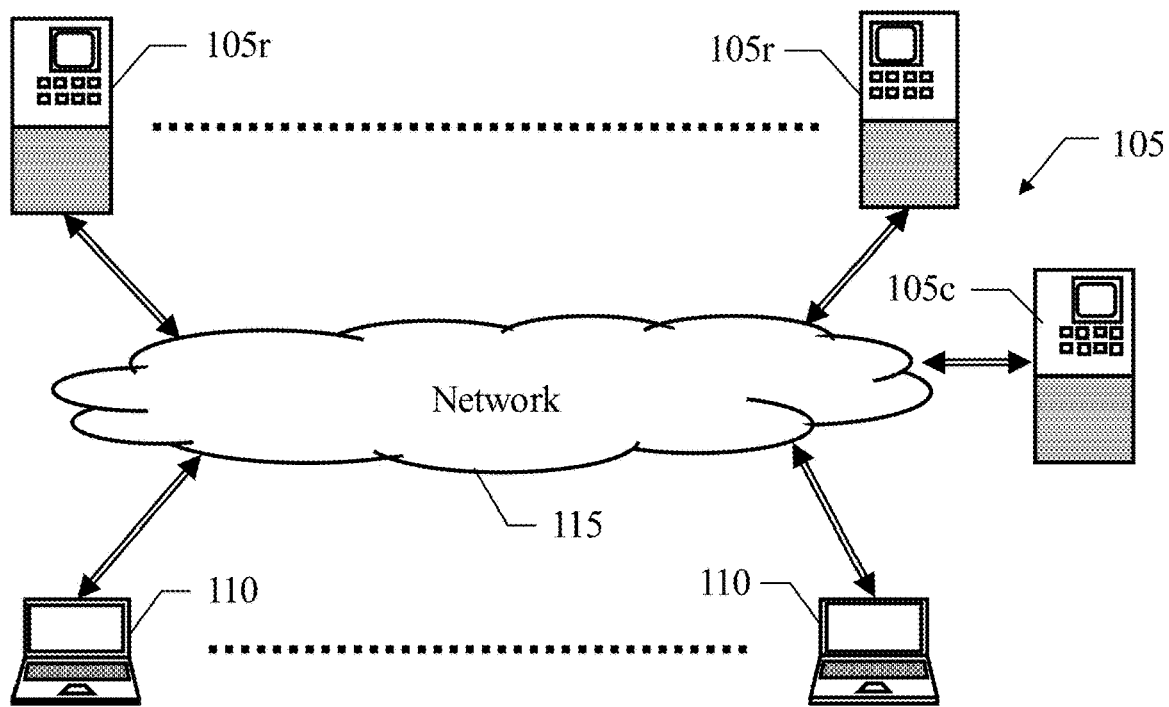

With reference in particular to FIG. 1, a schematic block diagram is shown of a computing system 100 wherein the solution according to an embodiment of the present disclosure may be practiced.

The computing system 100 has a distributed architecture based on a client/server model. Particularly, one or more server computing machines, or simply servers 105 provide services to one or more client computing machines, or simply clients 110. For this purpose, the clients 110 communicate with the servers 105 through a (communication) network 115 (for example, the Internet). One or more of the servers 105 are resource servers, differentiated with the reference 105r, which have (protected) resources that may be accessed by (authorized) users of the clients 110 (for example, files, databases, programs, web pages). One of the servers 105 (or more) is a control server, differentiated with the reference 105c, which controls access to the resources of the resource servers 105r by the users of the clients 110 (for example, to read, update, delete data, run programs, download web pages).

Each of the above-mentioned computing machines (servers 105 and clients 110) comprises several units that are connected among them through a bus structure 120 with one or more levels (with an architecture that is suitably scaled according to the type of the computing machine 105-110). Particularly, one or more microprocessors (μP) 125 control operation of the computing machine 105-110; a non-volatile memory (ROM) 130 stores basic code for a bootstrap of the computing machine 105-110 and a volatile memory (RAM) 135 is used as a working memory by the microprocessors 125. The computing machine 105-110 is provided with a mass-memory 140 for storing programs and data, for example, storage devices of one or more datacenters wherein the servers 105 are implemented and hard-disks for the clients 110. Moreover, the computing machine 105-110 comprises a number of controllers for peripherals, or Input/Output (I/O) units, 145; for example, the peripherals 145 of each server 105 comprise a network adapter (NIC) for plugging the server 105 into the corresponding datacenter and then connecting it to a console of the datacenter (for example, a personal computer, also provided with a drive for reading/writing removable storage units, such as optical disks like DVDs) and to a switch/router sub-system of the datacenter for its access to the network 115, whereas the peripherals 145 of each client 110 comprise a keyboard, a mouse, a monitor, a network adapter for connecting to the network 115 and a similar drive for reading/writing removable storage units.

Figure 2A:
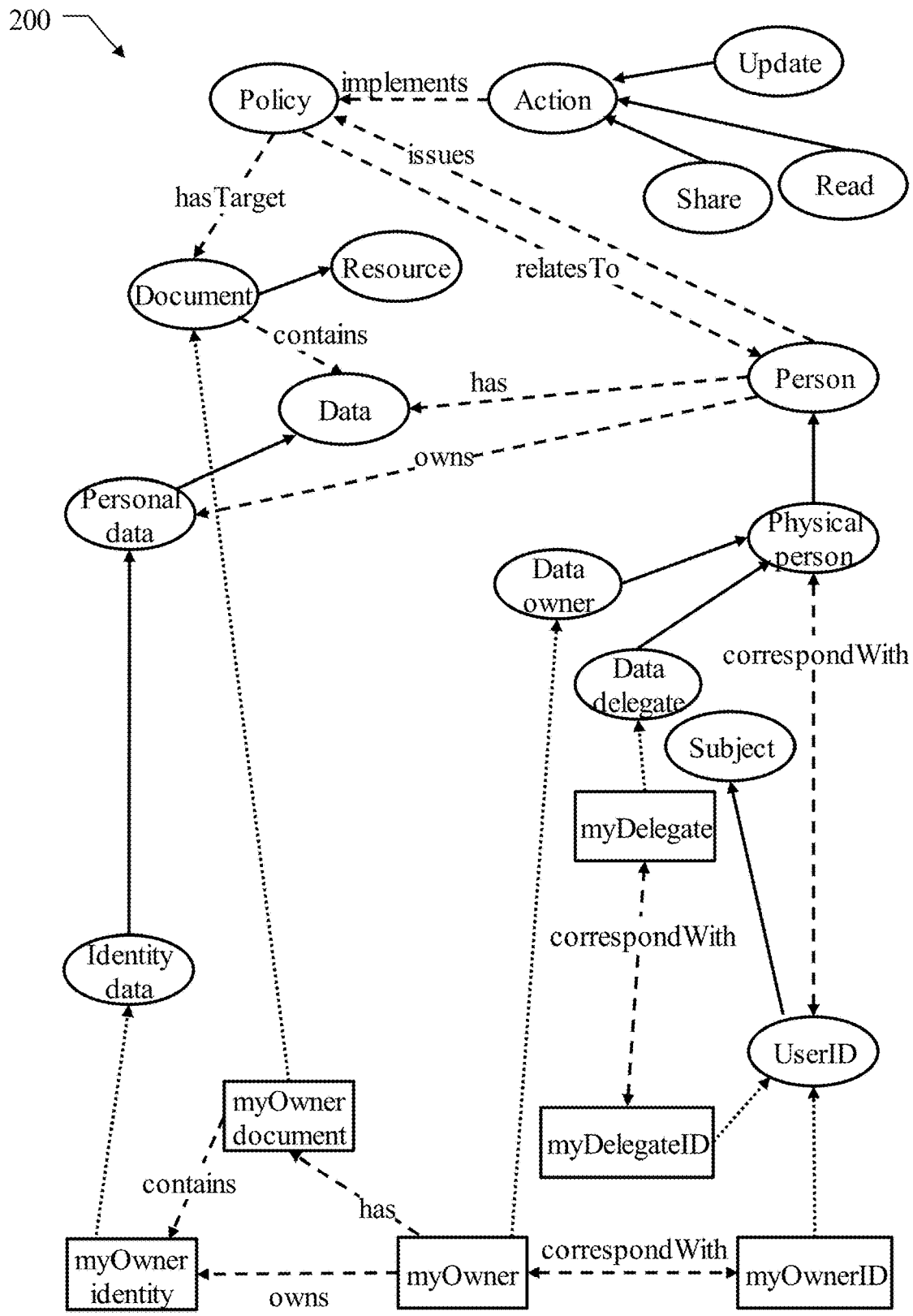
FIG. 2A-FIG. 2B show an example of application of the solution according to an embodiment of the present disclosure.
Figure 2B:
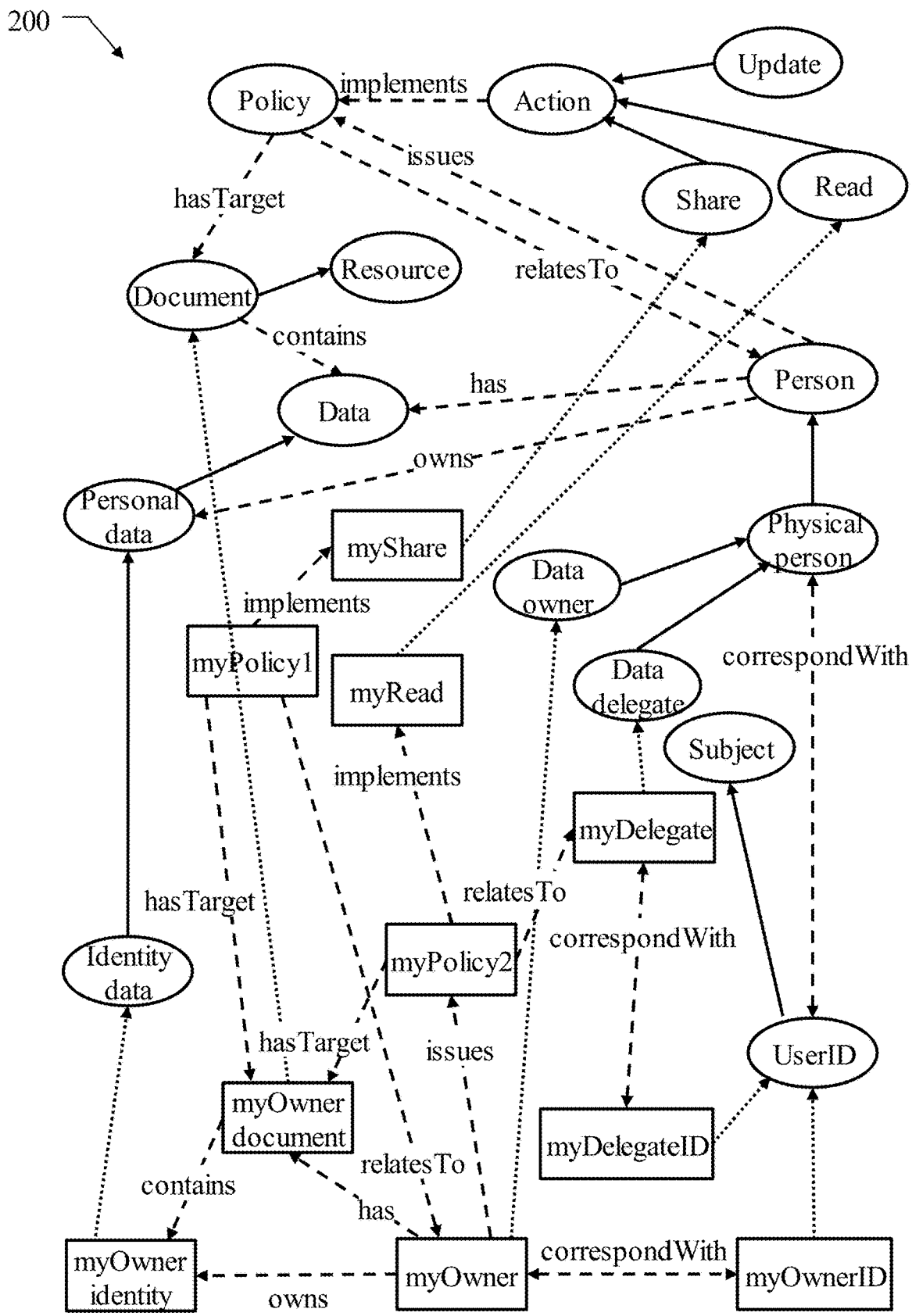

With reference now to FIG. 2A-FIG. 2B, an example is shown of application of the solution according to an embodiment of the present disclosure.

Starting from FIG. 2A, the access to the resources of the resource servers by the users of the clients (not shown in the figure) is controlled according to a (dynamic) access control ontology 200. In general, an ontology is a formal specification describing a semantic of a universe of discourse defined by entities of a domain of interest (i.e., its meaning in an unambiguous way); the ontology is based on a conceptualization, which provides an abstract view of the entities (simplified by ignoring their details, so as to capture commonalities among them) allowing their representation with concrete data structures conforming to the ontology. Most ontologies defines concepts (or classes), instances and predicates. The concepts represent abstract types of entities. The instances represent concrete entities (of corresponding types). The predicates comprise attributes and relations. The attributes (generally in the form of pairs name/value) represent properties that characterize concepts or instances to which they apply. The relations represent associations each between a pair of concept and/or instance. Particularly, an instantiation relation specifies that a (source) entity instantiates a (target) concept. Moreover, an inheritance (or hierarchical) relation ("isA") specifies that a (child) concept is a particular type of a (parent) concept. Facts (i.e., clauses that are always true) consisting of the definition of specific concepts or of the assertion of specific relations define the knowledge on the domain. Further (implicit) knowledge may be derived from the (explicit) knowledge defined in any ontology by a reasoning based on logical inference. For example, the ontologies may be used to extract information from large sources, to determine business policies, to take decisions, to detect anomalous behaviors.

In the solution according to an embodiment of the present disclosure, the access control ontology 200 specifies a knowledge of an access control to the resources by the subjects. In the example at issue, the access control ontology 200 relates to a very simple domain of interest in the context of data privacy. For this purpose, the access control ontology 200 comprises the following concepts (depicted with ovals in the figure): "Resource" (representing the types of resources whose access has to be controlled, i.e., the resources of the resource servers in this case) and particularly "Document", "Data", "Personal data", "Identity data" (for example, with attributes for name, surname, date and place of birth, address), the concepts "Subject" (representing the types of subjects involved in the control of the access to the resources, i.e., the users of the clients in this case) and particularly "UserID", "Person", "Physical person", "Data owner" and "Data delegate", and the concepts "Policy" (representing types of access control policies defining what the subjects may do on the resources) and particularly "Action", "Update", "Read" and "Share". The access control ontology 200 comprises the following inheritance relations (depicted with arrows in solid line in the figure): "Document" is a "Resource", "Personal data" is a "Data", "Identity data" is a "Personal data", "UserID" is a "Subject", "Data owner" and "Data delegate" are a "Physical person", "Physical person" is a "Person", "Update", "Read" and "Share" are an "Action"; properties (not shown in the figure) indicate that only "Data Owner" may issue "Share" and "Update", "Share" and "Update" may only relate to "Data owner" and "Read" may only relate to "Data delegate". The access control ontology 200 comprises the following instances (depicted with rectangles in the figure): "myOwner document" instantiating "Document", "myOwner identity" instantiating "Identity data", "myOwnerID" and "myDelegateID" instantiating "UserID", "myOwner" instantiating "Data owner" and "myDelegate" instantiating "Data delegate" (as depicted with arrows in dotted line in the figure). The access control ontology 200 comprises the following relations (depicted with arrows in dashed line in the figure):

"Document" contains "Data", "UserID" corresponds with "Physical person", "Person" has "Data", owns "Personal data" and issues "Policy", "Policy" has target "Document" and relates to "Person", "Action" implements "Policy", "myOwner document" contains "myOwner identity", "myOwnerID" corresponds with "myOwner", "myOwner" has "myOwner document" and owns "myOwner identity", and "myDelegateID" corresponds with "myDelegate".

Moving to FIG. 2B, an update request is received for updating the access control (to the resources by the users); the update request is generally expressed in unstructured way, and particularly in natural language. For example, the update request is "myOwner requests to allow sharing his/her identity data with myDelegate".

In response thereto, a consistency of the update request with the access control ontology 200 is verified. In the example at issue, "myOwner" owns "myOwner identity", which instantiates "Identity data" and s/he has "myOwner document" that contains "myOwner identity"; moreover, "myDelegate" instantiates "Data delegate". In view of the above, "myOwner" owns his/her identity data and then s/he may share them with "myDelegate" being a "Data delegate".

Therefore, the update request is accepted. In this case, the update request is converted into one or more update assertions (for updating the access control ontology 200) and the access control ontology 200 is updated according thereto. In the example at issue, the following assertions are generated and applied. Particularly, "myOwner" has "myOwner document", which contains "myOwner identity". Therefore, an instance "myShare" instantiating the concept "Share" and an instance "myPolicy1" instantiating the concept "Policy" are added; "myPolicy1" implements "myShare", has target "myOwner document" and relates to "myOwner". Moreover, an instance "myRead" instantiating the concept "Read" and an instance "myPolicy2" instantiating the concept "Policy" are added; "myOwner" issues "myPolicy2", and "myPolicy2" implements "myRead", has target "myOwner document" and relates to "myDelegate".

Another update request is received for updating the access control. For example, the update request is now "myDelegate requests to update myOwner's identity data". As above, a consistency of the update request with the access control ontology 200 is verified. In the example at issue, "myDelegate" does not own "myOwner identity" (being "Identity data"). In view of the above, "myDelegate" may not update the identity data of "myOwner". Therefore, the update request is refused.

Later on, an access request for a selected access (to a selected resource by a selected subject) is received. For example, an access request is "may myDelegateID read myOwner document?" and another access request is "may myDelegateID update myOwner document?"

In response thereto, an authorization of the selected access is determined according to the access control ontology 200. In the example at issue, for the access request "may myDelegateID read myOwner document?", "myDelegateID" corresponds with "myDelegate", "myPolilcy2" relates to "myDelegate", has target "myOwner document" and implements "myRead", and "myRead" instantiates "Read". In view of the above, "myDelegateID" may read "myOwner document". Therefore, the access request is granted. Conversely, for the access request "may myDelegateID update myOwner document?", "myDelegateID" corresponds with "myDelegate" again but now no access control policy (instantiating "Policy") relating to "myDelegate" exists that has target "myOwner document" and implements an action instantiating "Update". In view of the above, "myDelegateID" may not update "myOwner document". Therefore, the access request is denied.

In the above described solution any manual intervention for maintaining the access control up-to-date is avoided (or at least substantially reduced). This makes the management of the access control highly dynamic. At the same time, this has a beneficial effect on the management cost of the computing system. Moreover, the management of the access control is more accurate, reliable and valid.

Figure 3:
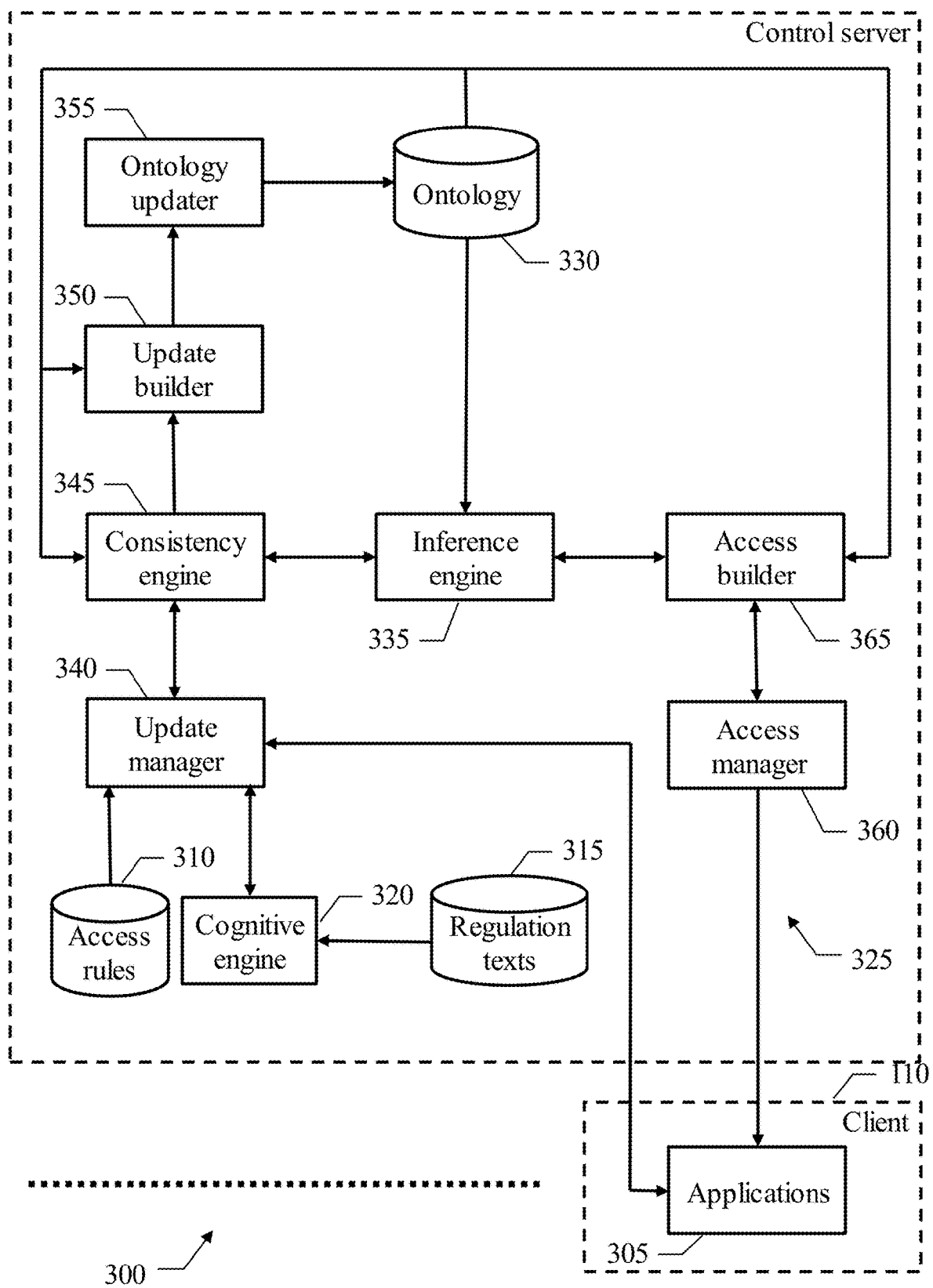
FIG. 3 shows the main software components that may be used to implement the solution according to an embodiment of the present disclosure, and FIG. 4A

With reference now to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least in part) into the working memory of the corresponding computing machines when the programs are running, together with corresponding operating systems and possible other application programs (not shown in the figure). The programs are initially installed into the mass memory, for example, from removable storage units or from the network. In this respect, each program may be a module, segment or portion of code, which comprises one or more executable instructions for implementing the specified logical function.

Starting from each client 110 (only one shown in the figure), it runs one or more software applications 305 for accessing the resources of the resource servers (not shown in the figure) by its user (for example, word processors, DMBSs, user interfaces, web browsers).

Passing to the control server 105c, it comprises the following software components. An access rule repository 310 defines access rules indicating (in a structured way) what the users are entitled to do on the resources according to roles thereof. For this purpose, an entry is provided for each role; the entry indicates one or more permissions assigned to the role for performing one or more activities on one or more resources (for example, a developer is authorized to read/write projects on which s/he is working, a team leader is authorized to read/write all the projects of the developers of his/her team, a manager is authorized to read all the projects of the developers reporting thereto). Moreover, an entry is provided for each user; the entry indicates userID and password of the user, and one or more roles assigned thereto. The access rules are defined in a formal language, for example, for use by a (standard) access control application based on a Role Based Access Control (RBAC) model (not shown in the figure). A regulation text repository 315 stores a corpus of regulation texts (in an unstructured way) comprising an indication of what the users may do on the resources. The regulation texts may be collected from a number of sources, either locally or remotely (for example, documents, e-mails, bulletin boards). The regulation texts are generally defined in natural language. A cognitive engine 320 determines update requests for the access control ontology from the regulation texts (by accessing the corresponding repository 315 in read mode).

In the solution according to an embodiment of the present disclosure, the control server runs an access control application 325 controlling the access to the resources (of the resource servers) by the users (of the clients 110) according to the access control ontology. The access control application 325 comprises the following software components. An access control ontology database 330 stores a knowledge base representing the access control ontology. The access control ontology is expressed in a formal language, for example, a Description Logic (DL) language indicating the names of concepts, attributes and (intensional) assertions defined by relations among the concepts (in a Terminological Box (TBox) representing the conceptualization of the desired entities, i.e., a sort of schema for context data of an actual context of knowledge), and the names of entities and (extensional) assertions defined by relations among the instances (in an Assertional Box (ABox) representing the entities that actually manifest this conceptualization, i.e., the context data themselves). An inference engine (or reasoner) 335 applies reasoning based on logical inference on the access control ontology (by accessing the corresponding database 330 in read mode).

An update manager 340 manages any update requests of the access control ontology. For this purpose, the update manager 340 accesses (in read mode) the access rule repository 310, and it interacts with the cognitive engine 320 and the software applications 305. A consistency engine 345 verifies (under the control of the update manager 340) the consistency of the update requests with the access control ontology (by accessing the corresponding database 330 in read mode and exploiting the inference engine 335). An update builder 350 converts (under the control of the consistency engine 345) the update requests into corresponding update assertions for updating the access control ontology (by accessing the corresponding database 330 in read mode). An ontology updater 355 applies (under the control of the update builder 350) the update assertions to the access control ontology (by accessing the corresponding database 330 in write mode).

An access manager 360 manages any access requests (for selected accesses to selected resources by selected subjects) submitted by the software applications 305. An access builder 365 converts (under the control of the access manager 360) the access requests into corresponding access queries for querying the access control ontology (by accessing the corresponding database 330 in read mode). The access queries (of semantic type) are defined in a semantic query language (for example, SPARQL). Moreover, the access builder 365 runs the access queries onto the access control ontology (by exploiting the inference engine 335).

Figure 4A:
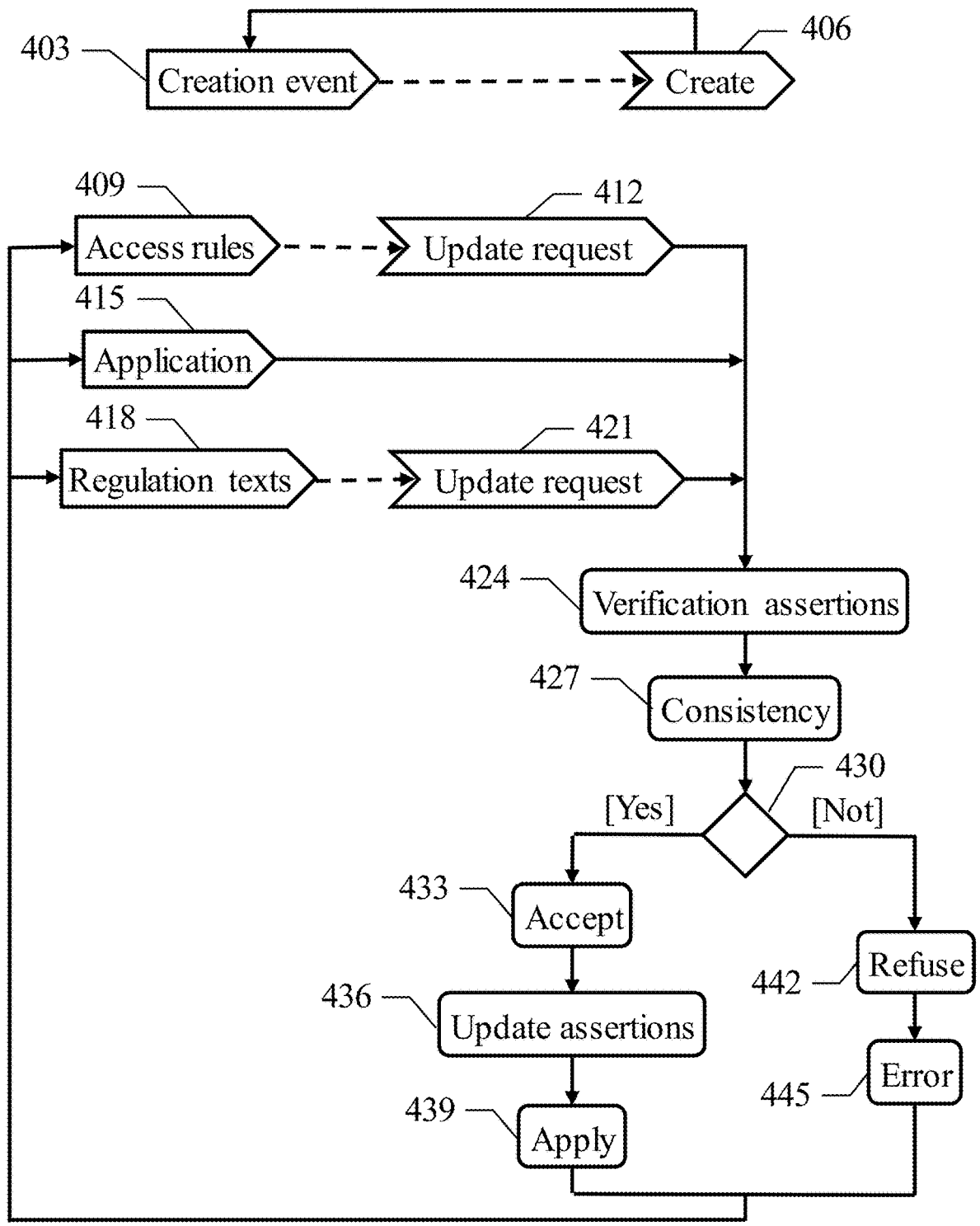
-FIG. 4B shows an activity diagram describing the flow of activities relating to an implementation of the solution according to an embodiment of the present disclosure.
Figure 4B:
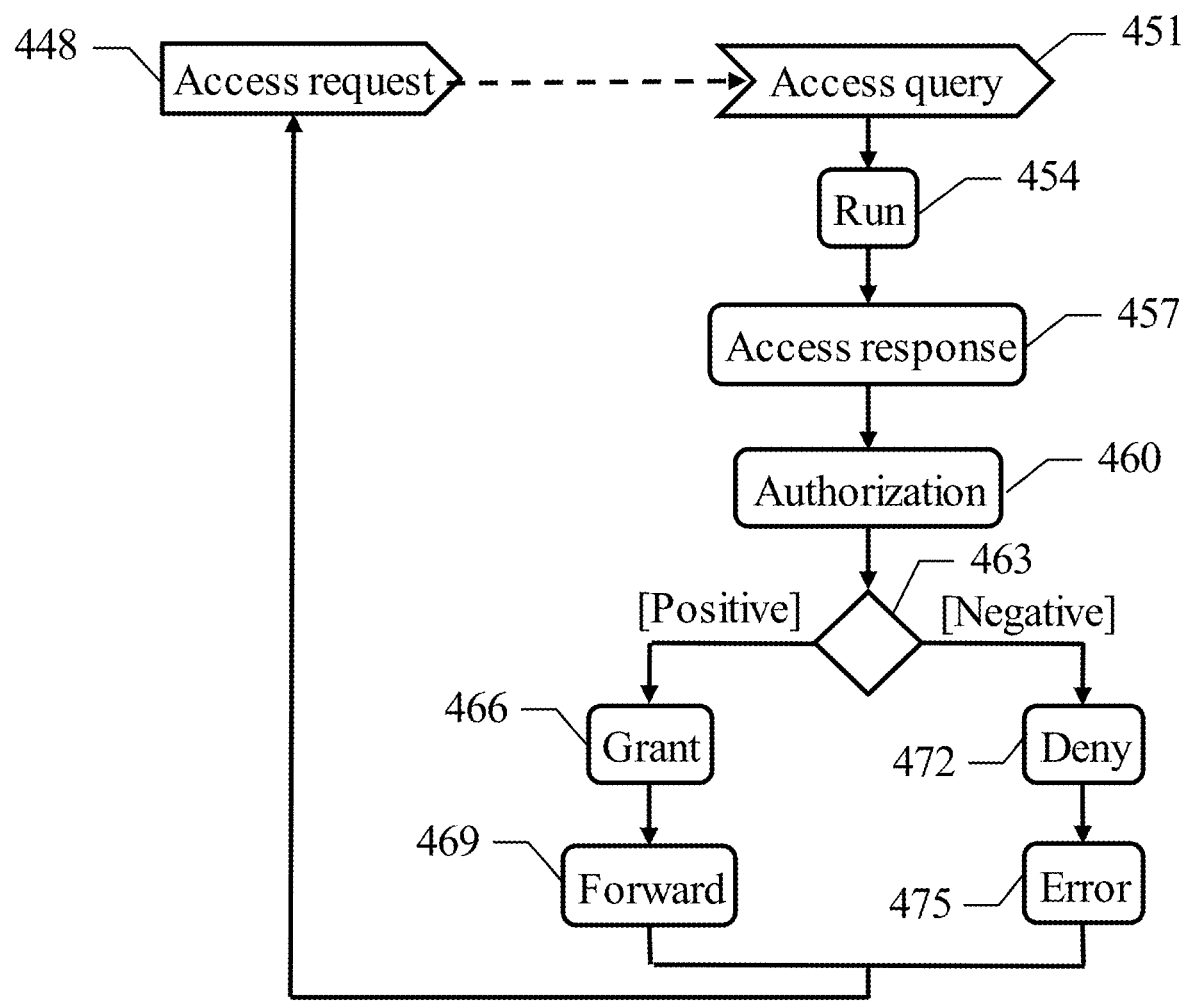

With reference now to FIG. 4A-FIG. 4B, an activity diagram is shown describing the flow of activities relating to an implementation of the solution according to an embodiment of the present disclosure.

Particularly, the activity diagram represents an exemplary process that may be used to control the access to the resources (of the resource servers) by the users (of the clients) with a method 400. In this respect, each block may correspond to one or more executable instructions for implementing the specified logical function on the control server.

The process passes from block 403 to block 406 whenever a (creation) event occurs that triggers the creation of the schema of the access control ontology. This happens a first time when the access management application is deployed and it may happen later on whenever the types of resources, users and/or access control policies change. In response thereto, the access control ontology is created (from scratch or from a previous version thereof) so as to conceptualize the desired entities (i.e., resources, users and access control policies). The creation of the access control ontology may be performed manually and/or automatically (in a similar way as its update described in the following). This operation generates a corresponding representation of the concepts (with their attributes) and relations among the concepts, which is saved into the ontology database. The process then returns to the block 403 waiting for a next creation event.

At run-time, the following operations are performed whenever an (update) event occurs that triggers an update of the context data of the access control ontology. Particularly, in a scenario the update manager at block 409 is notified of a (rule) change in the access rules stored in the corresponding repository. In response thereto, the update manager at block 412 generates an update request (or more) corresponding to the change of the access rules (for example, when a user passes from the role of developer to the role of team leader the update request indicates that the user has become authorized to read/write all the projects of his/her team). In another scenario the update manager at block 415 receives an update request (or more) from any software application (for example, entered manually by a corresponding user). Particularly, the update request relates to a change for one or more instances of the access control ontology (for example, indicating that a user has authorized another user to read his/her identity data). In another scenario, the cognitive engine at block 418 verifies the regulation texts (in the corresponding repository) as soon as a pre-defined period expires (for example, every 10-60 minutes); for every change in the access control (to the resources by the users) that is detected in the regulation texts, the cognitive engine at block 421 generates a corresponding update request (or more) relating to the data context and submits it to the update manager (for example, when a client sends an email to a supplier asking for its sale data and the supplier responds that the sale data will be made available online, the access request indicates that the client has become authorized to read the sale data thereof). In this way, it is possible to combine the use of structured information (the access control rules based on the RBAC model) with the use of unstructured information (the access requests entered manually by the users and the regulation texts); as a result, the access control rules may be simplified and changed less frequently (for example, only when it is desired to consolidate corresponding access control policies).

In any case, the process continues to block 424 from the block 412, the block 415 or the block 421. At this point, the update manager submits each update request to the consistency engine, which generates one or more (implicit) verification assertions for verifying the consistency of the access request with the access control ontology (as stored in the corresponding database). For example, in the very simple scenario discussed above (with reference to FIG. 2A-FIG. 2B) an update request is "myOwner requests to allow sharing his/her identity data with myDelegate"; in this case, the verification assertions are "myOwner is allowed to share myOwner identity" and "myDelegate may be allowed to read myOwner identity". Another update request is "myDelegate requests to update myOwner's identity data"; in this case, the verification assertion is "myDelegate may be allowed to update myOwner identity". The consistency engine at block 427 verifies (via the inference engine) whether the verification assertions are consistent with the access control ontology. In an embodiment, for this purpose the consistency engine generates (new) context data of the access control ontology by applying the verification assertions to its (current) context data, and it verifies whether the new context data is congruent with the schema of the access control ontology. In the example at issue, the verification assertions of the update request "myOwner requests to allow sharing his/her identity data with myDelegate" are consistent with the access control ontology, since "myOwner" instantiates "Data owner" (which may issue "Share") and "myDelegate" instantiates "Data delegate" (to which "Read" may relate). Conversely, the verification assertion of the update request "myDelegate requests to update myOwner's identity data" is inconsistent with the access control ontology, since "myDelegate" instantiates "Data delegate" that may not issue "Update").

The flow of activity branches at block 430 according to a result of this verification. If the verification assertions are consistent with the access control ontology, the consistency engine at block 433 accepts the update request and submits it to the update builder. The update builder at block 436 converts the update request into one or more update assertions for updating the access control ontology (as stored in the corresponding database); particularly, the update assertions may be already available when equal to the verification assertions that have been used to verify the consistency of the update request with the access control ontology. In the example at issue, the update request "myOwner requests to allow sharing his/her identity data with myDelegate" is consistent with the access control ontology; in this case, the update assertions are "myShare instantiates Share", "myPolicy1 instantiates Policy", "myPolicy1 implements myShare", "myPolicy1 has target myOwner document", "myPolicy1 relates to myOwner", "myRead instantiates Read", "myPolicy2 instantiates Policy", "myOwner issues myPolicy2", "myPolicy2 implements myRead", "myPolicy2 has target myOwner document" and "myPolicy2 relates to myDelegate". The update builder at block 439 submits the update request to the ontology updater, which applies them to the access control ontology (in the corresponding database).

Referring back to the block 430, if the verification assertions are instead inconsistent with the access control ontology, the consistency engine at block 442 refuses the update request and notifies the update manager accordingly. The update manager at block 445 returns a corresponding error message to an entity associated with the update event (for example, an administrator of the access rules, the user of the software application or one or more involved actors of the regulation texts). In the example at issue, the update request "myDelegate requests to update myOwner's identity data" is inconsistent with the access control ontology; in this case, the error message (indicating that "myDelegate" is not allowed to update the identify data of "myOwner") may be returned to the software application used by "myDelegate" to submit the update request.

In both cases, the flow of activity returns (from the block 439 or from the block 445) to the block 409, the block 415 or the block 418 waiting for a next update event.

In a completely independent way, the process passes from block 448 to block 451 whenever the access manager receives any access request (for a selected access to a selected resource by a selected subject). For example, the access manager runs in the background as a service, which intercepts any request of performing any activity on the resources that are submitted by the software applications to corresponding (target) software components in charge of them. In response thereto, the access manager submits the access request to the access builder, which converts it into a corresponding access query for querying the access control ontology (as stored in the corresponding database). For example, again in the very simple scenario discussed above (with reference to FIG. 2A-FIG. 2B) an access request is "may myDelegateID read myOwner document?" and another access request is "may myDelegateID update myOwner document?". An access query for the access request "may myDelegateID read myOwner document?" searches for any corresponding access control policy (myPolicy) implementing the action of reading (myRead), such as "SELECT ?myPolicy WHERE {?myPolicy a Policy; ?myPolicy relates to ex:myDelegate; ?myPolicy has target ex:myOwner document; ?myPolicy implements ?myRead; ?myRead a Read}; likewise, an access query for the access request "may myDelegateID update myOwner document?" searches for any corresponding access control policy (myPolicy) implementing the action of updating (myUpdate), such as "SELECT ?myPolicy WHERE {?myPolicy a Policy; ?myPolicy relates to ex:myDelegate; ?myPolicy has target ex:myOwner document; ?myPolicy implements ?myUpdate; ?myUpdate a Update}". The access builder at block 454 submits the access query to the inference engine, which runs it onto the access control ontology. The inference engine at block 457 returns an (access) response for the access query to the access builder. The access builder at block 460 determines an authorization for the access request (positive or negative) according to the access response, and returns it to the access manager. In the example at issue, the access query for the access request "may myDelegateID read myOwner document?" returns the corresponding access control policy "myPolicy2" indicating that "myDelegateID" is authorized to read "myOwner document" (positive authorization); conversely, the access query for the access request "may myDelegateID update myOwner document?" does not return any access control policy, meaning that "myDelegateID" is not authorized to update "myOwner document" (negative authorization).

The flow of activity branches at block 463 according to the authorization for the access request. If the authorization is positive, the access manager at block 466 grants the selected access of the access request. Therefore, the access manager at block 469 forwards the access request to the corresponding target software component (which accesses the selected resource(s) for the selected subject(s) as requested). In the example at issue, "myOwner document" is read by "myDelegateID". Referring back to the block 463, if the authorization is negative, the access manager at block 472 denies the selected access of the access request. Therefore, the access manager at block 475 returns a corresponding error message to the software application that has submitted it. In the example at issue, the error message indicates that the authorization to update "myOwner document" has been denied to "myDelegateID".

In both cases, the flow of activity returns (from the block 469 or from the block 475) to the block 448 waiting for a next access request.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling access to one or more resources of a computing system by one or more subjects. However, the resources many be in any number and of any type (for example, partial, different and additional resources with respect to the ones mentioned above) and they may be provided in any computing system (see below); moreover, the subjects may be in any number and of any type (for example, users, programs, services) and they may access the resources in any way (for example, for creating, reading, updating, deleting, executing, downloading or any combination thereof).

In an embodiment, the method comprises storing (by the computing system) a knowledge base. However, the knowledge base may be of any type (for example, stored in a database, a conceptual graph) and it may be provided in any way (for example, created, copied, downloaded).

In an embodiment, the knowledge base provides a knowledge of an access control to the resources by the subjects in conformity with an access control ontology. However, the knowledge of the access control may be represented in any way according to any ontology (for example, expressing concepts, instances, attributes, relations and/or frames in any formal knowledge representation language).

In an embodiment, the method comprises receiving (by the computing system) an update request for updating the access control. However, the update request may be of any type (for example, for adding, updating or removing any authorization) and it may be received in any way (for example, generated in response to changes in access control rules, submitted manually to software applications and/or generated in response to changes in regulation texts).

In an embodiment, the method comprises converting (by the computing system) the update request into one or more update assertions for updating the knowledge base. However, the update assertions may be in any number and of any type (for example, for adding, updating, deleting instances, relations, concepts and/or frames) and they be obtained in any way (for example, with or without verifying their consistency with the access control ontology).

In an embodiment, the method comprises updating (by the computing system) the knowledge base according to the update assertions. However, the knowledge base may be updated in any way (for example, by adding, updating, deleting instances, relations, concepts and/or frames).

In an embodiment, the method comprises receiving (by the computing system) an access request for a selected access to a selected resource of the resources by a selected subject of the subjects. However, the access request may be of any type (for example, for performing any number of activities on any number of resources by any number of subjects) and it may be received in any way (for example, submitted manually by a user, generated automatically by a software application).

In an embodiment, the method comprises converting (by the computing system) the access request into an access query for querying the knowledge base. However, the access query may be of any type (for example, working on named graphs, linked-data, triples) and it may be obtained in any way (for example, with logic reasoning of any order, of pattern type).

In an embodiment, the method comprises determining (by the computing system) an authorization of the selected access according to a result of the access query. However, the authorization may be of any type (for example, positive, negative, conditioned in any way).

In an embodiment, the method comprises granting or denying (by the computing system) the selected access according to the authorization thereof. However, the selected access may be granted or denied in any way (for example, by requesting further actions when the selected access has been granted, such as the entering of a second level password, by sending an alarm notification when the selected access has been denied, such as to a system administrator).

In an embodiment, the method comprises verifying (by the computing system) a consistency of the update request with the access control ontology. However, the consistency may be verified in any way (for example, with the possibility of relaxing its requirements for non-critical environments and/or updates).

In an embodiment, the method comprises accepting or refusing (by the computing system) the update request according to the consistency thereof. However, the update request may be enabled in any way (for example, by accepting/refusing it directly, allowing removing the inconsistency to force the update request).

In an embodiment, said step of verifying a consistency of the update request comprises generating (by the computing system) one or more verification assertions for verifying the consistency of the update request according to the update request. However, the verification assertions may be in any number and of any type (either the same or different with respect to the update assertions) and they may be generated in any way (for example, with logic reasoning of any order, of pattern type).

In an embodiment, said step of verifying a consistency of the update request comprises verifying (by the computing system) a consistency of the verification assertions with the access control ontology. However, the consistency of the verification assertions may be verified in any way (for example, by simulating the resulting context data and then verifying its consistency, by verifying the update assertions against constraints derived from the schema of the access control ontology).

In an embodiment, the method comprises receiving (by the computing system) the update request expressed in unstructured way. However, the (unstructured) update request may be of any type (for example, in natural or constructed language, submitted manually and/or generated automatically).

In an embodiment, said step of receiving the update request expressed in unstructured way comprises receiving (by the computing system) the update request expressed in natural language. However, the natural language may be of any type (for example, accepting any number of natural languages with or without automatic translations).

In an embodiment, said step of receiving the update request expressed in unstructured way comprises receiving by the computing system the access request being submitted manually. However, the access request may be submitted manually in any way (for example, in free form or in guided way).

In an embodiment, said receiving the update request expressed in unstructured way comprises detecting (by the computing system) a text change in one or more regulation texts relating to the access control. However, the regulation texts may be in any number and of any type (for example, partial, different and additional regulation texts with respect to the ones mentioned above) and the text change may be detected in any way (for example, by monitoring the regulation texts with any periodicity, by receiving notifications corresponding to a subscription thereto).

In an embodiment, said receiving the update request expressed in unstructured way comprises generating by the computing system the update request according to the text change. However, the updated request may be generated in any way according to the text change (for example, with cognitive, artificial intelligence, logic reasoning techniques).

In an embodiment, the method comprises receiving (by the computing system) the update request expressed in structured way. However, the (structured) update request may be of any type (for example, derived from access control rules based on roles or any other model).

In an embodiment, said step of receiving the update request expressed in structured way comprises detecting (by the computing system) a rule change in one or more access control rules for accessing the resources by the subjects. However, the rule change may be detected in any way (for example, by receiving a notification whenever the access control rules change, by monitoring the access control rules with any periodicity).

In an embodiment, the access control rules comprise an indication of one or more roles each having one or more permissions to access the resources and an indication of one or more of the roles assigned to each of the subjects. However, the roles may be in any number and of any type (for example, partial, different and additional roles with respect to the ones mentioned above), each one having any number and type of permissions (for example, to read, update, delete, execute, download or any combination thereof); moreover, each subject may be assigned any number of roles.

In an embodiment, said step of receiving the update request expressed in structured way comprises generating (by the computing system) the update request according to the rule change. However, the updated request may be generated in any way according to the rule change (for example, with logic reasoning of any order, of pattern type).

In an embodiment, the method comprises storing (by the computing system) the knowledge base comprising one or more resource concepts representing corresponding types of the resources, one or more subject concepts representing corresponding types of the subjects, one or more policy concepts representing corresponding types of access control policies for accessing the resources by the subjects, and one or more relations among the resource concepts, the subject concepts and/or the policy concepts. However, any schema of the access control ontology may be defined in this way.

In an embodiment, the method comprises updating (by the computing system) the knowledge base by updating one or more resource instances instantiating the resource concepts representing the resources, one or more subject instances instantiating the subject concepts representing the subjects, one or more policy instances instantiating the policy concepts representing the access control policies and/or one or more further relations among the resource instances, the subject instances and/or the policy instances. However, any context data of the access control ontology may be defined in this way.

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program configured for causing a control computing machine to perform the above-described method when the computer program is executed on the control computing machine. An embodiment provides a computer program product that comprises a computer readable storage medium having program instructions embodied therewith; the program instructions are executable by a control computing machine to cause the control computing machine to perform the same method. However, the computer program may be implemented as a stand-alone module, as a plug-in for a pre-existing software program (for example, any access control application), or even directly in the latter. Moreover, the computer program may be executed on any control computing machine (see below).

An embodiment provides a system comprising means that are configured for performing each of the steps of the above-described method. An embodiment provides a system comprising a circuit (i.e., any hardware suitably configured, for example, by software) for performing each of the steps of the same method. However, the system may be of any type (for example, based on a local, wide area, global, cellular or satellite network and exploiting any type of wired and/or wireless connections, or even with a stand-alone architecture); moreover, the system may comprise the control computing machine alone, the control computing machine with any number of resource control computing machines and/or client computing machines, with each computing machine that may be implemented by any physical machine, virtual machine or a static/dynamic combination thereof. In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features, as well as the submitted claims, may be combined in any way.

What is claimed is:

1. A method for controlling access to one or more resources of a computing system by one or more subjects, the method comprising:

storing, by the computing system, a knowledge base by providing a knowledge of an access control to the one or more resources using the one or more subjects in conformity with an access control ontology, wherein the access control ontology comprises: the one or more resources, the one or more subjects, and one or more policies, and wherein the one or more resources represents types of resources whose access is to be controlled, the one or more subjects represent types of subjects involved in control of an access to the one or more resources, and the one or more policies represent types of access control policies defining in a structured way what the one or more subjects have access to do on the one or more resources;

obtaining, by the computing system, an update change request in an unstructured way for updating the access control, the obtaining comprising:

detecting, by the computing system, a text change in a regulation text repository in an unstructured way indicating what the one or more subjects may do on the one or more resources, wherein the text change is detected by monitoring the regulation text repository, and wherein the regulation text repository includes data collected from sources and regulates access of users to the one or more resources in a natural language, the update change request being obtained according to the text change;

verifying, based on obtaining the update change request, consistency of the update change request obtained in the unstructured way with the access control ontology, the verifying including generating one or more implicit verification assertions for verifying the consistency of the change request with the access control ontology, and identifying that the one or more implicit verification assertions are consistent with the access control ontology, the identifying that the one or more implicit verification assertions are consistent with the access control ontology including:

generating new context data of the access control ontology by applying the one or more implicit verification assertions to current context data of the access control ontology; and verifying that the new context data is congruent with a schema of the access control ontology;

converting, by the computing system based on verifying consistency, the update change request into one or more update assertions for updating the knowledge base;

updating, by the computing system, the knowledge base according to the one or more update assertions;

receiving, by the computing system, an access request for a selected access to a selected resource of the one or more resources by a selected subject of the one or more subjects;

converting, by the computing system, the access request into an access query for querying the knowledge base;

determining, by the computing system, an authorization of the selected access according to a result of the access query; and granting, by the computing system, the selected access according to the authorization thereof.

2. The method according to claim 1, wherein said obtaining the update request expressed in unstructured way comprises:

receiving by the computing system the update request expressed in a natural language.

3. The method according to claim 1, wherein said obtaining the update request expressed in unstructured way comprises:

receiving, by the computing system, the access request, wherein the access request was submitted manually.

4. The method according to claim 1, further comprising:

generating, by the computing system, the update request according to the text change.

5. The method according to claim 1, wherein said obtaining the update request further comprises:

detecting, by the computing system, a rule change in one or more access control rules for accessing the one or more resources by the one or more subjects, the access control rules comprising an indication of one or more roles each having one or more permissions to access the one or more resources and an indication of one or more of the roles assigned to each of the one or more subjects; and generating, by the computing system, the update request according to, at least in part, the rule change.

6. The method according to claim 1, wherein the method further comprising:

storing, by the computing system, the knowledge base comprising one or more resource concepts representing corresponding types of the one or more resources, one or more subject concepts representing corresponding types of the one or more subjects, one or more policy concepts representing corresponding types of access control policies for accessing the one or more resources by the subjects, and one or more relations among the one or more resource concepts, the one or more subject concepts and/or the policy concepts; and updating, by the computing system, the knowledge base by updating one or more resource instances instantiating the one or more resource concepts representing the one or more resources, one or more subject instances instantiating the one or more subject concepts representing the one or more subjects, one or more policy instances instantiating the policy concepts representing the access control policies and/or one or more further relations among the one or more resource instances, the one or more subject instances and/or the policy instances.

7. A computer program product for controlling access to one or more resources of a computing system by one or more subjects, the computer program product comprising a computer readable storage medium having program instructions embodied therewith, the program instructions executable by a control computing machine to cause the control computing machine to perform a method comprising:

storing, by the computing system, a knowledge base by providing a knowledge of an access control to the one or more resources using the one or more subjects in conformity with an access control ontology, wherein the access control ontology comprises: the one or more resources, the one or more subjects, and one or more policies, and wherein the one or more resources represents types of resources whose access is to be controlled, the one or more subjects represent types of subjects involved in control of an access to the one or more resources, and the one or more policies represent types of access control policies defining in a structured way what the one or more subjects have access to do on the one or more resources;

obtaining, by the computing system, an update change request in an unstructured way for updating the access control, the obtaining comprising:

detecting, by the computing system, a text change in a regulation text repository in an unstructured way indicating what the one or more subjects may do on the one or more resources, wherein the text change is detected by monitoring the regulation text repository, and wherein the regulation text repository includes data collected from sources and regulates access of users to the one or more resources in a natural language, the update change request being obtained according to the text change;

verifying, based on obtaining the update change request, consistency of the update change request obtained in the unstructured way with the access control ontology, the verifying including generating one or more implicit verification assertions for verifying the consistency of the change request with the access control ontology, and identifying that the one or more implicit verification assertions are consistent with the access control ontology, the identifying that the one or more implicit verification assertions are consistent with the access control ontology including:
  generating new context data of the access control ontology by applying the one or more implicit verification assertions to current context data of the access control ontology; and
  verifying that the new context data is congruent with a schema of the access control ontology;

converting, by the computing system based on verifying consistency, the update change request into one or more update assertions for updating the knowledge base;

updating, by the computing system, the knowledge base according to the one or more update assertions;

receiving, by the computing system, an access request for a selected access to a selected resource of the one or more resources by a selected subject of the one or more subjects;

converting, by the computing system, the access request into an access query for querying the knowledge base;

determining, by the computing system, an authorization of the selected access according to a result of the access query; and granting, by the computing system, the selected access according to the authorization thereof.

8. A control computing machine for controlling access to one or more resources of a computing system by one or more subjects, wherein the control computing machine implements a method which comprises:
  storing, by the computing system, a knowledge base by providing a knowledge of an access control to the one or more resources using the one or more subjects in conformity with an access control ontology, wherein the access control ontology comprises: the one or more resources, the one or more subjects, and one or more policies, and wherein the one or more resources represents types of resources whose access is to be controlled, the one or more subjects represent types of subjects involved in control of an access to the one or more resources, and the one or more policies represent types of access control policies defining in a structed way what the one or more subjects have access to do on the one or more resources;

obtaining, by the computing system, an update change request in an unstructured way for updating the access control, the obtaining comprising:
    detecting, by the computing system, a text change in a regulation text repository in an unstructured way indicating what the one or more subjects may do on the one or more resources, wherein the text change is detected by monitoring the regulation text repository, and wherein the regulation text repository includes data collected from sources and regulates access of users to the one or more resources in a natural language, the update change request being obtained according to the text change;

verifying, based on obtaining the update change request, consistency of the update change request obtained in the unstructured way with the access control ontology, the verifying including generating one or more implicit verification assertions for verifying the consistency of the change request with the access control ontology, and identifying that the one or more implicit verification assertions are consistent with the access control ontology, the identifying that the one or more implicit verification assertions are consistent with the access control ontology including:
    generating new context data of the access control ontology by applying the one or more implicit verification assertions to current context data of the access control ontology; and
    verifying that the new context data is congruent with a schema of the access control ontology;

converting, by the computing system based on verifying consistency, the update change request into one or more update assertions for updating the knowledge base;

updating, by the computing system, the knowledge base according to the one or more update assertions;

receiving, by the computing system, an access request for a selected access to a selected resource of the one or more resources by a selected subject of the one or more subjects;

converting, by the computing system, the access request into an access query for querying the knowledge base;

determining, by the computing system, an authorization of the selected access according to a result of the access query; and granting, by the computing system, the selected access according to the authorization thereof.

* * * * *